(12) United States Patent
Dufresne, II et al.

(10) Patent No.: US 8,800,884 B2
(45) Date of Patent: Aug. 12, 2014

(54) METHOD FOR CONTROLLING COOLING IN A DATA STORAGE SYSTEM

(75) Inventors: Daniel A Dufresne, II, Bow, NH (US); Daniel Savilonis, Brookline, MA (US); John Kevin Bowman, Brighton, MA (US); John V Burroughs, East Sandwich, MA (US); Michael Robillard, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 392 days.

(21) Appl. No.: 13/180,341

(22) Filed: Jul. 11, 2011

(65) Prior Publication Data

US 2011/0290894 A1    Dec. 1, 2011

Related U.S. Application Data

(62) Division of application No. 12/165,220, filed on Jun. 30, 2008, now Pat. No. 7,988,063.

(51) Int. Cl.
*F24F 7/00* (2006.01)
*G06F 1/20* (2006.01)
*H05K 5/00* (2006.01)

(52) U.S. Cl.
USPC .............. 236/49.3; 361/679.46; 361/679.48

(58) Field of Classification Search
USPC ............... 236/49.3; 702/132; 711/112, 114; 361/678, 676, 688, 695, 690, 679.46; 374/100; 454/184
See application file for complete search history.

(56) References Cited

U.S. PATENT DOCUMENTS

2003/0214781 A1 *  11/2003  Kolb et al. .................. 361/687

* cited by examiner

*Primary Examiner* — Chen Wen Jiang
(74) *Attorney, Agent, or Firm* — Krishnendu Gupta; Konrad R. Lee (57) ABSTRACT

A system having: a midplane having air flow channels therein; a disk drive mounted to a first side of the midplane; and a temperature sensors mounted to the midplane. The system includes a pair of electrical chassis connected to a second side of the midplane. A first one of the chassis has therein: a fan; and a fan controller for controlling speed of the fan in response to a temperature control signal. A second one of the chassis has therein: a microprocessor for: detecting temperature signals produced by the temperature sensors; comparing differences between the detected temperature signals; and selecting one of the detected temperature control signal from the compared differences as the temperature control signal. A faulty one of the temperature sensors is detected by: selecting one of the detected temperature control signal as the faulty one of the plurality of temperature sensors from the compared differences.

2 Claims, 6 Drawing Sheets

METHOD FOR CONTROLLING COOLING IN A DATA STORAGE SYSTEM

CROSS REFERENCE TO RELATED APPLICATION

This is a divisional of, and claims the benefit of the filing date of, application Ser. No. 12/165,220 filed Jun. 30, 2008.

TECHNICAL FIELD

This invention relates generally to methods for cooling data storage systems.

BACKGROUND AND SUMMARY

As is known in the art, in one type of data storage system, storage processors are used to provide a system interface between a host computer/server and a bank of disk drives. In one of such system, a midplane is provided having the storage processors and power supplies plugged into one side, say the front side of a printed circuit board, commonly referred to as a midplane, and disk drive units plugged into the other side, say back side, of the midplane. Typically, a pair of storage processors and a pair of power supplies is provided for redundancy One such arrangement for such a system is to provide a rack-mounted configuration wherein the power supplies and storage processors are disposed in rack mountable chassis; for example, the power supply chassis are mounted in a side-by-side arrangement on say a top rack while the storage processor chassis are mounted side-by-side below the power supply chassis on a lower rack. In one such system fans are provided in each of the power supplies along with fan controllers for adjusting fan speed in accordance with a desired temperature signal fed by microprocessors in the storage processor chassis in response to temperature sensors disposed in the path of air flow used to cool the disk drives. More particularly, in order to cool the disk drives in accordance with the temperature signal, the fans draw air that passes along the outer sides of the disk drive units, then through air flow channels in the midplane, then through openings in the rear of the storage processor chassis, then through openings in the upper portion of the storage processor chassis, then into openings in the bottom portion of the power supply chassis (which, as noted above, store the fans) and then finally out the front of the power supply chassis.

As noted above, temperature sensors provide the information on which cooling fan speeds are changed. In low temperature environments, fans can be operated at lower speeds with the ensuing benefit of lower noise and lower power consumption. These sensors also provide information on excessive ambient temperature conditions which could damage systems or result in loss of critical data if the system were not shut down. Multiple sensors are sometimes utilized to allow for sensor failures without requiring the system to be shutdown for lack of information on which to base the speed changes and shutdown decisions outlined above. The sensor issue is further complicated by the fact that the sensors are located in air streams which are preheated by upstream electronics. This is a result of a combination of system architecture (such as drives mounted in the front of a front-to-rear cooled enclosure) and the sensors being located on the first available printed circuit board (PCB) in the system.

Thus, two major issues present themselves:

First, using multiple sensors, so that backup information is available in the result of a sensor failure, requires that a failed sensor be identified and its reading ignored. A failed sensor may not only present no data but may also present false data. Therefore, some algorithm must be adopted to cull out or ignore the false sensor readings.

Second, a change in fan speed results in a change in air preheat as the air stream flows over upstream electronics. As a result, the sensor to ambient temperature difference decreases as the fan speed increases. Consequently, the sensor temperature where the fan speed is increased has to be higher than the temperature where the fan speed is lowered. A resulting hysteresis is often observed in these systems.

In accordance with the present invention, a method is provided for cooling a data storage system. The system includes a midplane with an electrical chassis connected to one side of the midplane and a disk drive connected to an opposite side of the midplane. The chassis has therein a fan for forcing air past the disk drive and channels in the midplane. The midplane has a plurality of temperature sensors mounted thereto, such plurality of temperature sensors being disposed to detect the temperature of the air flow passing through the channels. The fan has the speed thereof controlled in response to a temperature control signal. The method includes: detecting temperature signals produced by the plurality of temperature sensors; comparing differences between the detected temperature signals; and selecting one of the detected temperature control signals from the compared differences as the temperature control signal.

In one embodiment, the selecting includes disregarding at least one of the detected temperature signals as the temperature control signal.

In one embodiment, the selecting includes selecting the hottest one of the detected signals as the temperature control signal unless the compared differences indicates that one of the differences in temperature is greater than a predetermined temperature difference in which case a lower temperature than the hottest temperature is selected as the temperature control signal.

In one embodiment, a method is provided for detected a faulty one of a plurality of temperature sensors. The method includes: detecting temperature signals produced by the plurality of temperature sensors; comparing differences between the detected temperature signals; selecting one of the detected temperature control signals as the faulty one of the plurality of temperature sensors from the compared differences.

In one embodiment, a system is provided having: a midplane having air flow channels therein; a disk drive mounted to a first side of the midplane; and a plurality of temperature sensors mounted to the midplane. The system includes; a pair of electrical chassis connected to a second side of the midplane. A first one of the pair of chassis has therein: a fan; and a fan controller for controlling speed of the fan in response to a temperature control signal. A second one of the pair of chassis has therein: a microprocessor for: detecting temperature signals produced by the plurality of temperature sensors; comparing differences between the detected temperature signals; and selecting one of the detected temperature control signal from the compared differences as the temperature control signal.

In one embodiment, the fans draw air past the disk drives and through the channels in the midplane.

In one embodiment, the plurality of temperature sensors is disposed to detect the temperature of air flowing through the channels.

In one embodiment, a system is provided having a midplane having air flow channels therein. The system includes a first pair of electrical chassis connected to a first side of the midplane and a second pair of electrical chassis connected to the first side of the midplane. A plurality of disk drives is connected to a second side of the midplane. A pair of fans is provided, each one of the fans being disposed in a corresponding one of the first pair of electrical chassis. A pair of fan controllers is provided, each one of the fan controllers being disposed in a corresponding one of the first pair of electrical chassis, each one of the fan controllers controlling speed of a corresponding one of the fans in response to a common temperature control signal. The fans draw air past the disk drives and through channels in the midplane. A plurality of temperature sensors is mounted to the midplane, such a plurality of temperature sensors being disposed to detect the temperature of the air flow passing through the channels. A pair of microprocessors is provided, each one being disposed in a corresponding one of the pair of second chassis, one of the pair of such microprocessors being selected to: detect temperature signals produced by the plurality of temperature sensors; compare differences between the detected temperature signals; and select one of the detected temperature control signal from the compared differences as the common temperature control signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
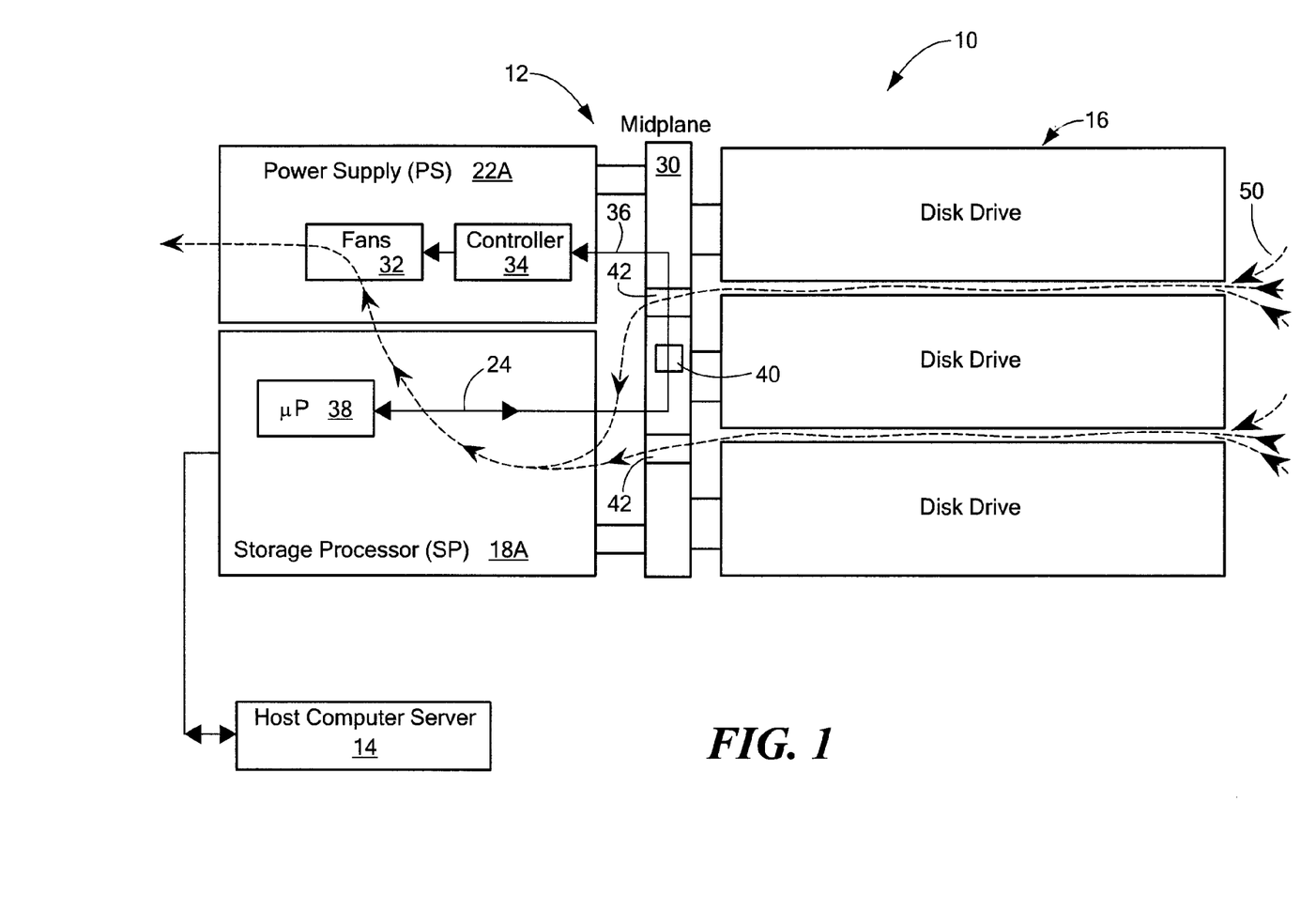
FIG. 1 is block diagram of a side elevation view of a data storage system having a cooling system in accordance with the invention.
Figure 2:
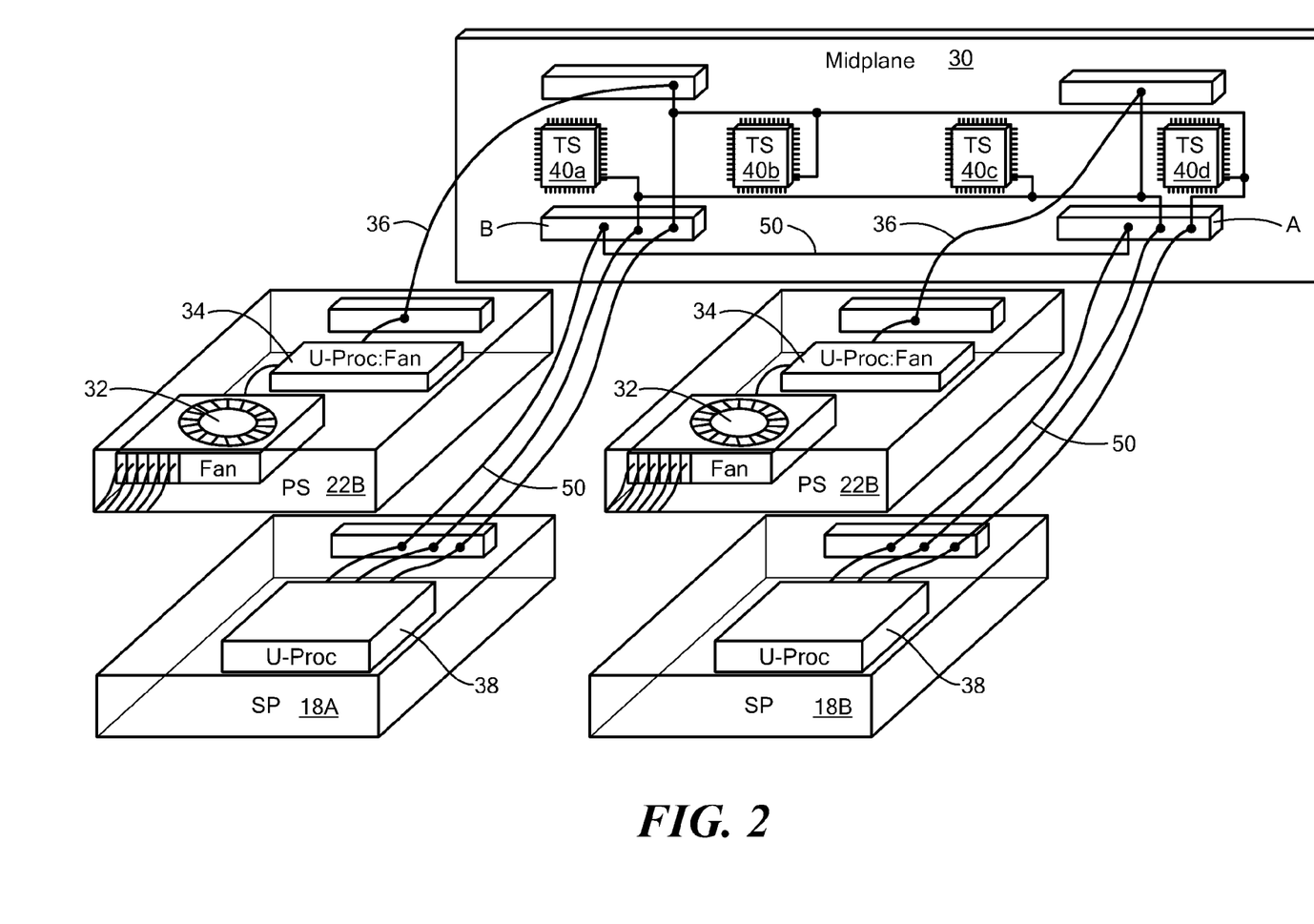
FIG. 2 is a sketch of a portion of the data storage system of FIG. 1.

Referring now to FIGS. 1 and 2, a system interface 12 is provided for a data storage system 10. The system interface 12 couples data between a host computer/server 14 and a bank of disk drives 16.

More particularly, the system interface 10 here, for example, includes a pair of data storage processors 18A, 18B, configured for transferring data between the host computer/server 14 and the disk drives 16. The interface 12 also includes a pair of power supplies 22A, 22B. It is noted that storage processor 18A plugs into slot B of the midplane 30, as indicated in FIG. 2 and that storage processor 18B plugs into slot A of the midplane 30, as indicated in FIG. 2.

Here, for example, the storage processors 18A, 18B and power supplies 22A, 22B plug into one side, say the front side of a printed circuit board, commonly referred to as a midplane 30 (shown in more detail in FIG. 3), and disk drives 16 plugged into the other side, say back side, of the midplane 30. Typically, a pair of the storage processors 18A, 18B and a pair of the power supplies 22A, 22B is provided for redundancy.

Here, for example, the system 10 is a rack-mounted configuration wherein the power supplies 22A, 22B and storage processors 18A, 18B are disposed in rack mountable chassis, not shown; for example, the power supply chassis 22A, 22B are mounted in a side-by-side arrangement on say a top rack while the storage processor chassis 18A. 18B are mounted side-by-side below the power supply chassis 22A, 22B on a lower rack, as shown in FIG. 2.

Fans 32 are provided in each of the power supplies 22A, 22B along with fan controllers 34 for adjusting fan speed in accordance with a desired temperature signal 36 fed by microprocessors 38 in the storage processor chassis 18A, 18B in response to temperature sensors 40 (FIG. 1), here four temperature sensors 40a-40d (FIG. 2), disposed on the midplane 30 in the path of air flow, represented by arrows 50 in FIG. 1, used to cool the disk drives 16. More particularly, and referring to FIG. 1, in order to cool the disk drives 16 in accordance with the temperature signal 36 fed to the fan controllers 34, the fans 32 draw air which passes along the outer sides disk drive units 16, then through air flow channels 42 (FIG. 1) in the midplane 30 in the path of the temperature sensors 40, here the temperature sensors 40a-40d, then through openings in the rear of the storage processor chassis 18A, 18B, then through openings in the upper portion of the storage processor chassis 18A, 18B, then into openings in the bottom portion of the power supply chassis 22A, 22B (which, as noted above, store the fans 32) and then finally out the front of the power supply chassis 22A, 22B.

Each one of the storage processors 18A, 18B includes the microprocessor 38. The pair of microprocessors 38 are in communication one with the other via the communication link 50 through the midplane 30. It is noted that only a selected one of the pair of microprocessors provides, at any one period of time, the temperature control signal 36 for the fan controllers 34 in each of the power supply chassis 22A, 22B. That is, the selected one of the pair of microprocessors provides a common temperature control signal 36 for both fan controllers 34.

Here, there are four temperature sensors 40a, 40b, 40c, 40d are disposed along the midplane 30 in the path of airflow passing through channels 42 in the midplane 30 as described above in connection with FIG. 2. Here, each one of the four temperatures sensors 40a, 40b, 40c, 40d provides temperature signals to both microprocessors 38, here on I2C busses. It is noted that the either selected one of the microprocessors 38, is adapted (i.e., wired) to provided the common temperature control signal to both of the fan controllers 34; as noted above, at any one time, only one of the pair of microprocessors 38 is used to provide a common temperature control signal to both of the fan controllers 34.

Thus, the fans 32 are located in the power supply chassis 22A. 22B and are controlled over an I2C communication path that is common to both storage processors in an enclosure, not shown, for the system interface 10. While, as noted above, only one of the pair of microprocessors 38 is used to provide a common temperature control signal to both of the fan controllers because otherwise:

The two microprocessors 38 may set the fans to different speeds resulting in oscillation of fan speeds or the false diagnosis of a fan failure.

The repeated attempts and subsequent failures of one microprocessors 38 to successfully control the fans may result in both microprocessors 38 being unable to control the fans at all.

With the arrangement described herein, such problems are solved by:

One of the pair of microprocessors 38 (a default one of the pair of microprocessors 38 designated at start up as the default microprocessors 38) controls the fans.

Each of the pair of microprocessors 38 uses its peer communication path to negotiate control for the fans, and to give status of its ability to control the fans.

Control of the fans will failover in the event of a fault on the controlling (i.e., selected one of the pair of microprocessors 38).

Control of the fans will also be failed over in the event of a numerous consecutive faults on the monitoring of the fans and the temperature sensors.

Figure 3:
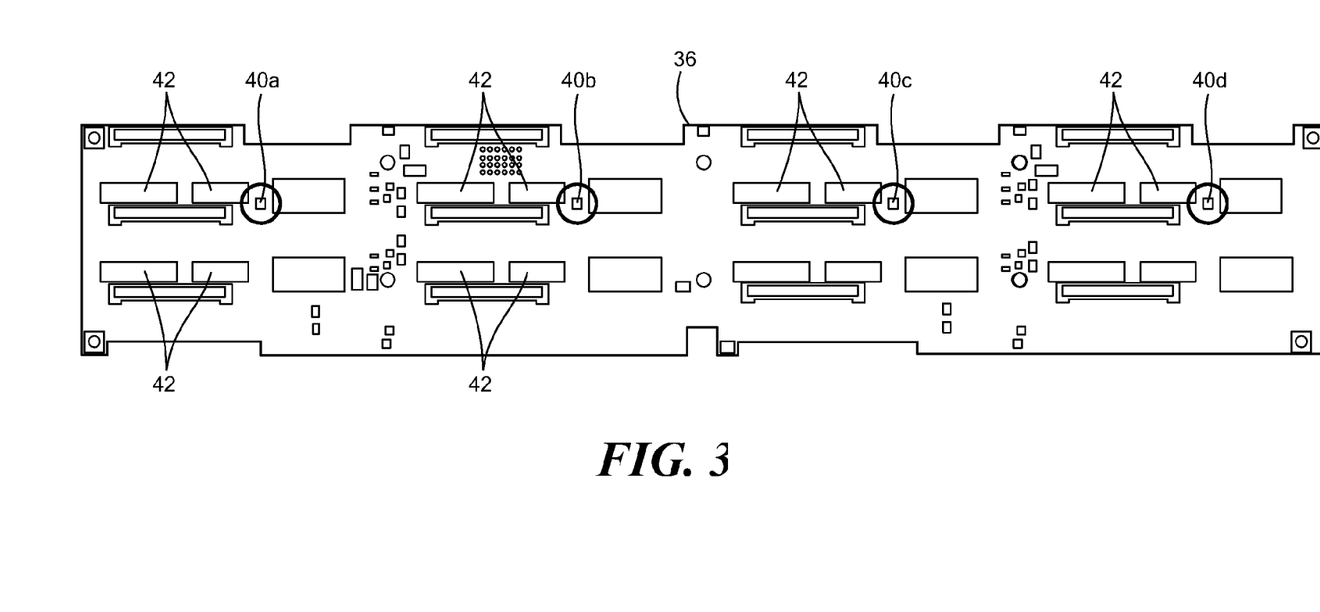
FIG. 3 is a plan view of a midplane used in the system of FIG. 1 as viewed from the disk drive side of the system.

The Control algorithm, to be described in connection with FIG. 3, will reset every time there is a microprocessors 38 insertion/removal.

A failure mode is supported such that both microprocessors 38 may have degraded control of the fans at the same time.

The algorithm performed by the microprocessors 38 may be summarized as follows:

First, data is collected from the four temperature sensors by the default one of the pair of microprocessors 38;

If the default one of the pair of microprocessors 38 detects that one of the pair of communication buses has failed, a decision is made by the default one of the pair of microprocessors 38 based on the maximum temperature of the two remaining temperature sensors; otherwise:

The default one of the pair of microprocessors 38:
reads all four temperature sensors; sorts the read temperatures from maximum temperature to minimum temperature (T4, T3, T2, T1 with T4 being the maximum temperature reading);
calculates the temperature difference between:
T4 and T3=DT top and
T2 and T1=DT bot
IF DT bot>DT top then the temperature to be disregarded is either T2 or T1
Use T4 for fan speed change or shutdown decision.
IF DT top>DT bot then the temperature to be disregarded is either T4 or T3
IF DT top>a predetermined temperature, 20 degrees C., for example, the temperature T4 is disregarded and considered as being produced by a faulty sensor while T3 is used for fan speed change or shutdown decisions.
IF DT top>20 degrees C., then the temperature from the highest temperature T4 is considered valid and is used for fan speed change or shutdown decision.
IF DT top=DT bot then there is a temperature to be ignored or if there are two temperatures to be disregarded and considered as being produced by a faulty sensor, the decision is based on the maximum sensor temperature T4.

Figures 4, 5:
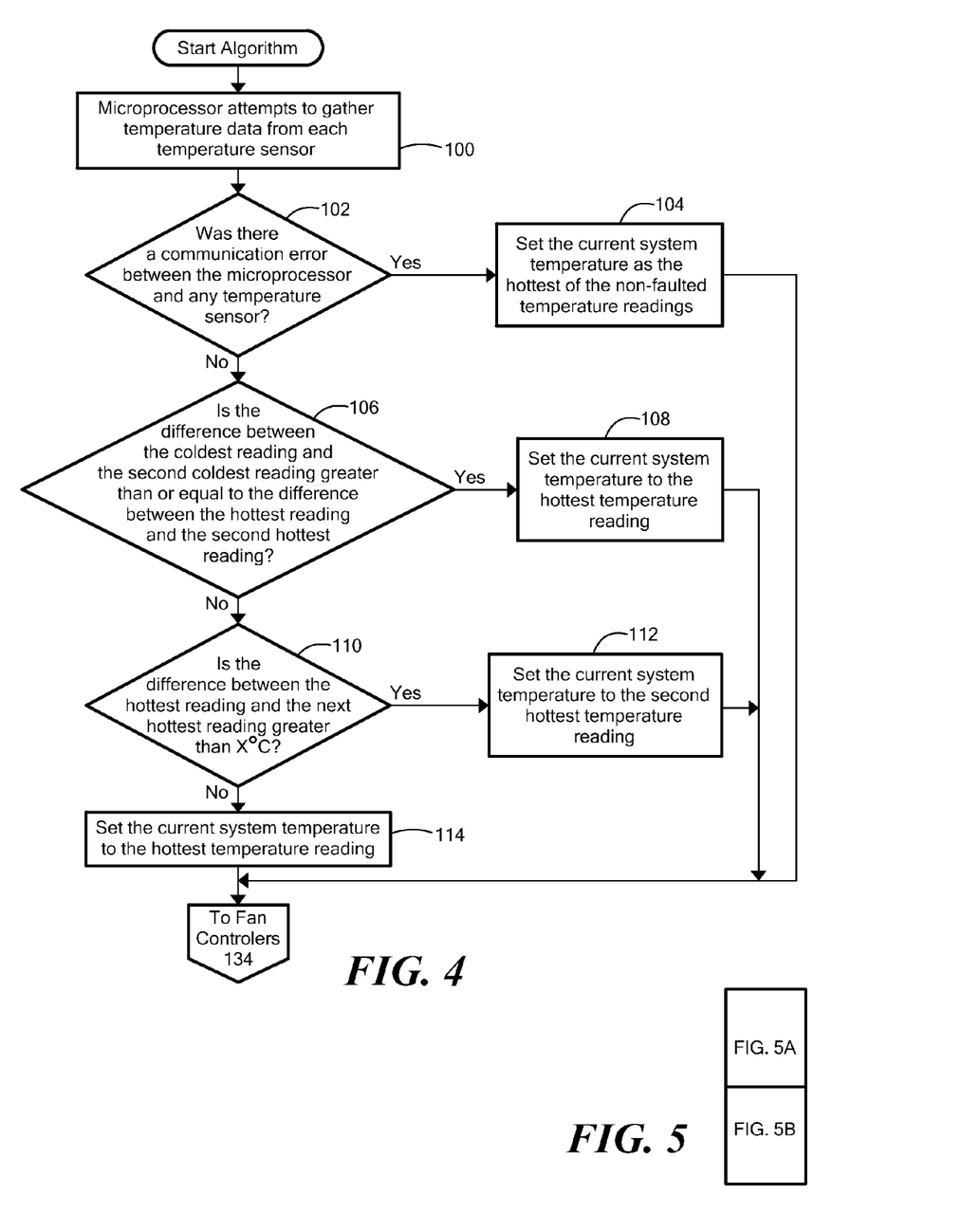
FIG. 4 is a flowchart of a method used to cool the data storage system of FIG. 1 according to the invention.

Referring now to FIG. 4, a more detailed flowchart of the algorithm is shown.

The microprocessor 38 in the default (i.e., selected one of the pair of microprocessors 38) attempts to gather temperature data from each temperature sensor (Step 100). The microprocessor 38 in the default storage processor determines whether there was a communication error between the microprocessor 38 and any temperature sensor 40a-40d (Step 102). If there was a detected communication error, the microprocessor 38 sets the control system temperature signal 36 as the hottest of the non-faulted temperature readings, here the temperature T4, and transmits such temperature T4 to both fan controllers 34 (Step 104).

On the other hand, if the microprocessor 38 fails to detect a communication error (Step 102), the microprocessor 38 determines whether the difference between the coldest temperature T1 reading and the second coldest temperature reading T2 (i.e., T2−T1) greater than or equal to the difference between the hottest reading T4 and the second hottest reading T3 (i.e., T4−T3) (Step 106). If (T4−T3) is greater than (T2−T1), the microprocessor 38 sets the current system temperature control signal 35 to the hottest temperature reading T4 and transmits an appropriate fan control signal that corresponds to the temperature T4 to both fan controllers 32 (Step 108). On the other hand, if (T4−T3) is not greater than (T2−T1), the microprocessor 38 determines whether the difference between the hottest temperature reading T4 and the next hottest temperature reading T3 (i.e., T4−T3) is greater than a predetermined temperature difference X° C. (Step 110). If T4−T3 is greater than the predetermined temperature difference X° C., the microprocessor 38 sets the current system temperature control signal 36 to the second hottest temperature reading T3 and transmits an appropriate fan control signal that corresponds to the temperature reading T3 to both fan controllers 32 (112). On the other hand, if T4−T3 is not greater than the predetermined temperature difference X° C., the microprocessor 38 sets the current system temperature signal 36 to the hottest temperature reading T4 and transmits an appropriate fan control signal that corresponds to the temperature T4 to both fan controllers 32 (Step 114).

Figure 5A:
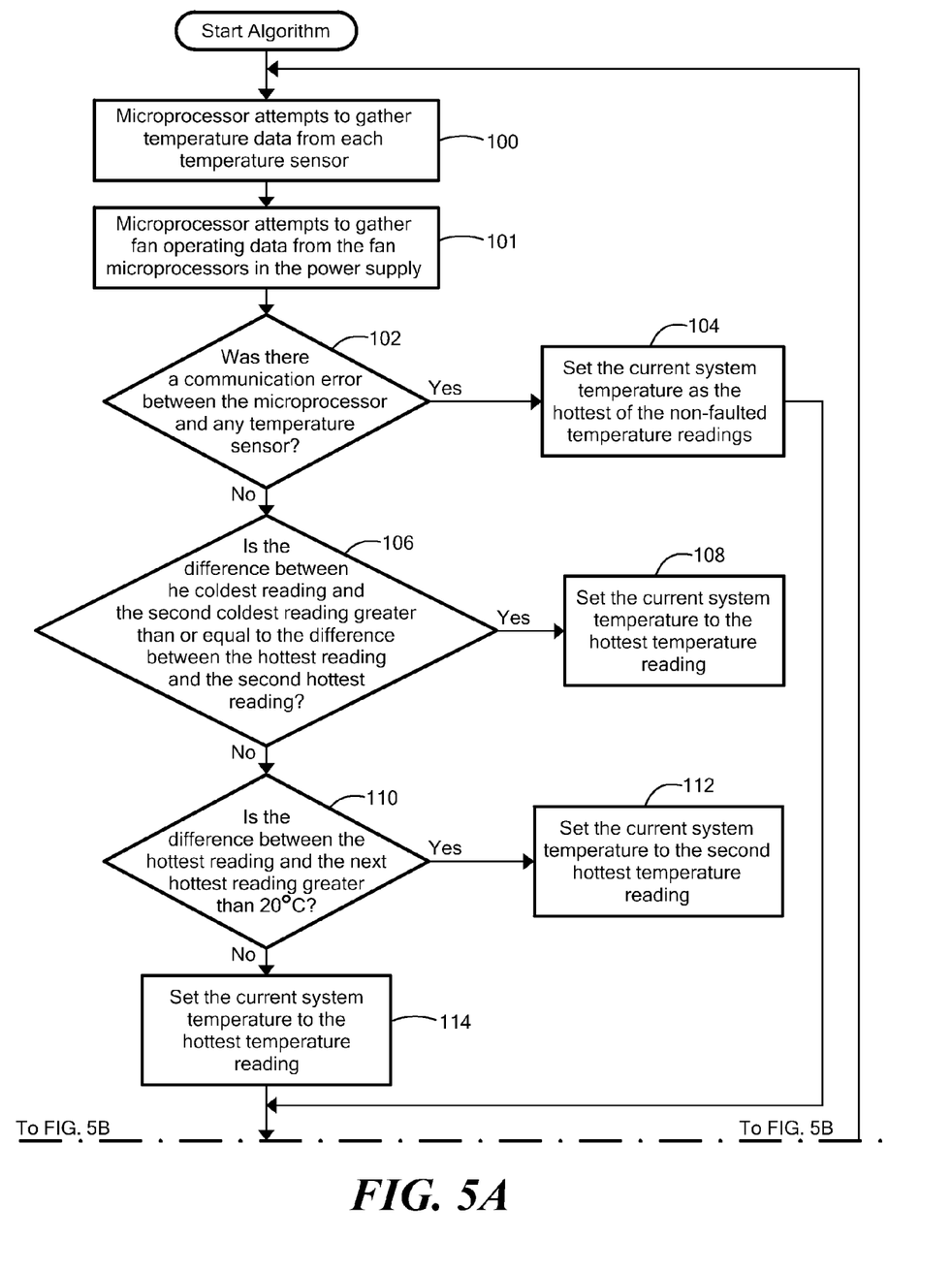
FIGS. 5A and 5B together is a more detailed flowchart of a method used to cool the data storage system of FIG. 1 according to the invention.
Figure 5B:
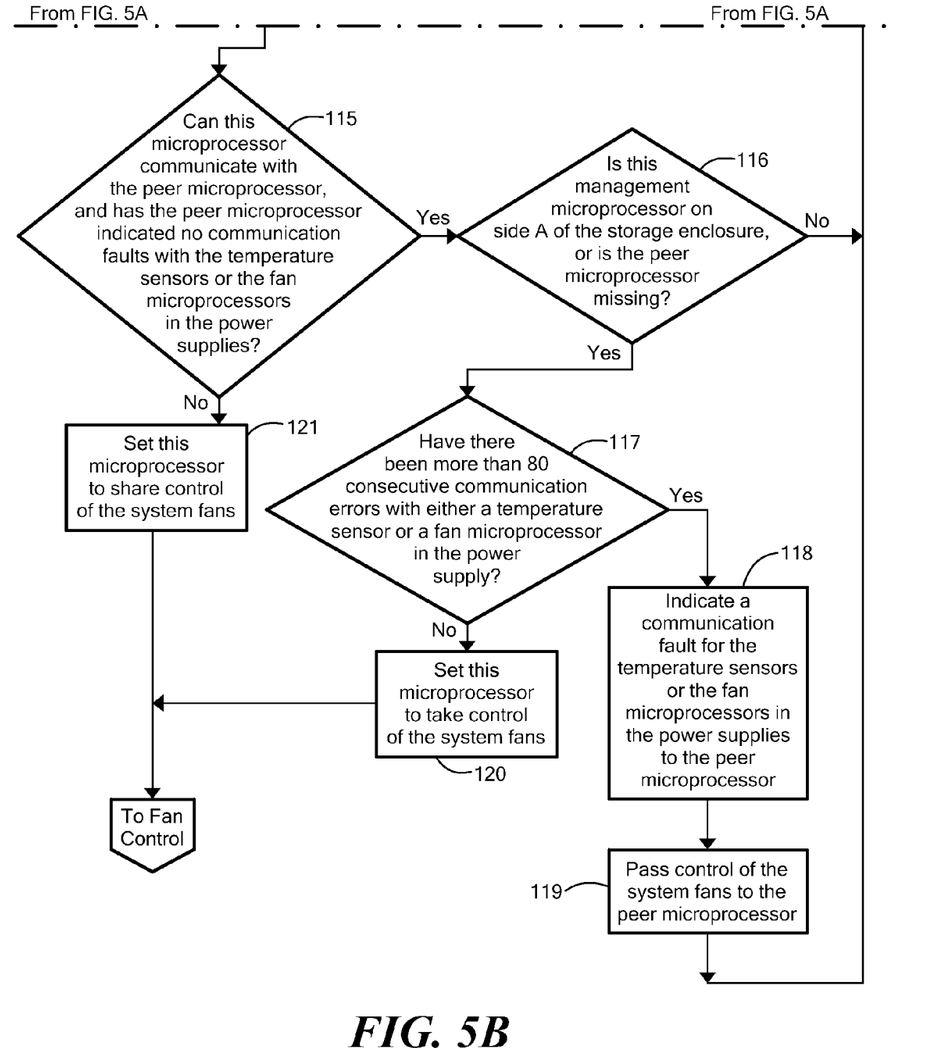

More particularly, referring to FIGS. 5A and 5B. the default, or then selected, microprocessor, attempts to gather temperature data from each temperature sensor, Step 100. The default, or then selected, microprocessor attempts to gather fan operating data from the fan microprocessors in the power supplies, Step 101. The default, or then selected, microprocessor determines whether there has been a communication error between the microprocessor and any temp sensor, Step 102. If so, the default, or then selected, microprocessor sets the current system temperature as the hottest of the non-faulted temperature readings, Step 104; otherwise, the default, or then selected, microprocessor determines whether the difference between the coldest reading and the second coldest reading greater than or equal to the difference between the hottest reading and the second hottest reading, Step 106. If so, the default, or then selected, microprocessor sets the current system temperature to the hottest temperature reading, Step 108; otherwise, the default, or then selected, microprocessor determines whether the difference between the hottest reading and the next hottest reading greater than 20° C. If so, the default, or then selected, microprocessor sets the current system temperature to the second hottest temperature reading, Step 112; otherwise, the default, or then selected, microprocessor sets the current system temperature to the hottest temperature reading, Step 114.

After completion of Steps 104, 108, or 112, or 114, both microprocessors determines whether they can communicate with their respective peer, and whether the respective peer microprocessor indicated no communication faults with the temperature sensors or the fan microprocessors in the power supplies, Step 115. Both microprocessors detect whether they are plugged into slot A (FIG. 2) or whether their respective peer microprocessor is missing from the system, Step 116. If the microprocessor is plugged into slot A or its respective peer is missing, it becomes the default microprocessor. The default, or then selected, microprocessor determines whether there been more than, for example, 80 consecutive communication errors with either a temperature sensor or a fan microprocessor in the power supplies, Step 117. If yes, the default, or then selected, microprocessor indicates a communication fault for the temperature sensors or the fan microprocessors in the power supplies to the peer microprocessor, Step 118 and passes control of the system fans to its respective peer microprocessor, Step 119; otherwise, the default (or selected) microprocessor is set to take control of the system fans, Step 120. On the other hand, if in Step 115, either microprocessor determines that it cannot communicate with its respective peer, or that the respective peer microprocessor indicated a communication fault with the temperature sensors or the fan microprocessors in the power supplies, such microprocessor shares control of the system fans with the peer microprocessor. Step 121.

The problems solved using the above-mentioned approach are common to any system where the fans are located in a shared resource. For instance, many if not all systems will have intelligently controlled fans located in their enclosure's power supplies.

A number of embodiments of the invention have been described. Nevertheless, it will be understood that various modifications may be made without departing from the spirit and scope of the invention. Accordingly, other embodiments are within the scope of the following claims.

What is claimed is:

1. A method for cooling a data storage system, such system having a midplane with an electrical chassis connected to one side of the midplane and a disk drive connected to an opposite side of the midplane, such chassis having therein a fan for forcing air past the disk drive and channels in the midplane, such midplane having a plurality of temperature sensors mounted thereto, such plurality of temperature sensors being disposed to detect the temperature of the air flow passing through the channels, such fan having the speed thereof controlled in response to a temperature control signal, such method comprising:

detecting temperature signals produced by the plurality of temperature sensors;

comparing differences between the detected temperature signals;

selecting one of the detected temperature control signal from the compared differences as the temperature control signal;

wherein the selecting includes disregarding at least one of the detected temperature signals as the temperature control signal.

2. The method recited in claim 1 wherein the selecting includes selecting the hottest one of the detected signal as the temperature control signal unless the compared differences indicates that one of the differences in temperature is greater than a predetermined temperature difference in which case a lower temperature than the hottest temperature is selected as the temperature control signal.

* * * * *